(12) United States Patent
Lee et al.

(10) Patent No.: US 11,396,217 B2
(45) Date of Patent: Jul. 26, 2022

(54) HEATER ASSEMBLY

(71) Applicants: Hyundai Motor Company, Seoul (KR); KIA Motors Corporation, Seoul (KR)

(72) Inventors: Sang Shin Lee, Suwon-si (KR); Man Ju Oh, Yongin-si (KR); So La Chung, Seoul (KR); Jae Woong Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 492 days.

(21) Appl. No.: 16/680,850

(22) Filed: Nov. 12, 2019

(65) Prior Publication Data
US 2020/0376929 A1  Dec. 3, 2020

(30) Foreign Application Priority Data
Jun. 3, 2019 (KR) .................... 10-2019-0065596

(51) Int. Cl.
*B60H 1/22* (2006.01)

(52) U.S. Cl.
CPC .......... *B60H 1/2225* (2013.01); *B60H 1/2215* (2013.01); *B60H 1/2227* (2019.05)

(58) Field of Classification Search
CPC .... B60H 1/2225; B60H 1/215; B60H 1/2227; B60H 1/00428; B60H 1/2226; H05B 2203/013; H05B 2203/017; H05B 1/0236; F24C 7/043; B32B 27/32; B32B 27/30
See application file for complete search history.

(56) References Cited

U.S. PATENT DOCUMENTS

2013/0143014 A1* 6/2013 Kawasumi .............. B32B 27/08
428/220
2016/0001632 A1* 1/2016 Song ........................ H05B 3/20
219/202

FOREIGN PATENT DOCUMENTS

KR  10-2018-0089940 A  8/2018

* cited by examiner

*Primary Examiner* — Emmanuel E Duke
(74) *Attorney, Agent, or Firm* — Slater Matsil, LLP (57) ABSTRACT

A heater assembly includes a base panel; a heating member disposed behind the base panel opposite a heating target space; a thermal conductive film having a film shape, attached to an outer surface facing the heating target space of the base panel, and transmitting heat of the heating member to the outer surface of the base panel by having an end portion extending behind the base panel and coupled to the heating member; and a shield layer preventing the thermal conductive film from being directly exposed to the heating target space by being attached to an outer surface facing the heating target space of the thermal conductive film.

11 Claims, 6 Drawing Sheets

HEATER ASSEMBLY

CROSS-REFERENCE TO RELATED APPLICATION

This application claims the priority benefit of Korean Patent Application No. 10-2019-0065596, filed on Jun. 3, 2019 in the Korean Intellectual Property Office, the disclosure of which is incorporated herein by reference.

BACKGROUND

1. Field

The present disclosure relates to a heater assembly of a vehicle.

2. Description of the Related Technology

Recently, vehicles include heaters for the comfort of passengers. Further, vehicles are being increasingly motorized to be driven not by an engine, but by a motor, and accordingly, it is difficult to secure a heat source for heating in the wintertime because the waste heat of an engine cannot be used.

The disclosure of this section is to provide background of the invention. Applicant notes that this section may contain information available before this application. However, by providing this section, Applicant does not admit that any information contained in this section constitutes prior art.

SUMMARY

Aspects of the present disclosure provide a heater assembly that is used for the interior materials, etc. of a vehicle, is formed with a small thickness, has no danger of causing a burn, and very quickly conducts heat.

In view of an aspect, a heater assembly according to the present disclosure includes: a base panel; a heating member disposed behind the base panel opposite a heating target space; a thermal conductive film having a film shape, attached to an outer surface facing the heating target space of the base panel, and transmitting heat of the heating member to the outer surface of the base panel by having an end portion extending behind the base panel and coupled to the heating member; and a shield layer preventing the thermal conductive film from being directly exposed to the heating target space by being attached to an outer surface facing the heating target space of the thermal conductive film.

The heating member may be an electrical resistance heating member or a sheath heater.

The heating member is disposed at a predetermined distance behind the base panel, whereby the heating member may not be in direct contact with the base panel and may not be exposed to the heating target space.

The thermal conductive film may be a graphite film.

An end portion of the thermal conductive film is wound around a surface of the heating member, whereby the heat of the heating member may be transmitted from the end portion to the other end portion of the thermal conductive film.

The thermal conductive film may be attached to the outer surface facing the heating target space of the base panel, and may be coupled to the heating member by bending rearward around an end portion of the base panel and then extending.

A through-slit may be formed in the base panel and an end portion of the thermal conductive film may be extended behind the base panel through the through-slit and then coupled to the heating member.

A film assembly may be formed by stacking a plurality of thermal conductive films and may be attached to the outer surface of the base panel, the thermal conductive films of the film assembly may be extended and attached to the base panel with end portions coupled together to the heating member, and extension lengths may be different.

A clip may be disposed on a rear surface of the base panel and the heating member may be fastened to the clip in a state of being combined with the film assembly, so the heating member may be disposed at a predetermined distance behind the base panel.

Insulators may be disposed at portions, which are in contact with the heating member or the film assembly, of the clip, so thermal damage may be prevented.

A through-slit may be formed in an end portion of the base panel, an end portion of the thermal conductive film may be extended behind the base panel through the through-slit and then coupled to the heating member, and an end portion of the base panel may be folded over the base panel, whereby the through-slit may be blocked and the thermal conductive films may be fixed to the base panel.

An insulating layer is disposed between the base panel and the thermal conductive film, thereby being able to prevent thermal damage to the base panel.

The base panel may be an interior panel in a vehicle and the heating target space may be the interior of a vehicle.

According to the present disclosure, the heater assembly is used for the interior materials, etc. of a vehicle, is formed with a small thickness, has no danger of causing a burn, and very quickly conducts heat.

Another aspect of the invention provides a heater assembly comprising: a base panel having an outer surface facing a heating target space; a heating member disposed behind the base panel and in a rear space opposite the heating target space; a thermal conductive film attached to the outer surface of the base panel, and extending to the rear space, the thermal conductive film comprising a distal end portion coupled to the heating member, the thermal conductive film transmitting heat of the heating member to the outer surface of the base panel; and a shield layer preventing the thermal conductive film from being directly exposed to the heating target space by being attached to an outer surface facing the heating target space of the thermal conductive film such that the shield layer is disposed between the heating target space and the thermal conductive film. The thermal conductive film is disposed between the base panel and the shield layer. heater assembly; heating member; thermal conductive film having a distal end attached to the heating member.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF EMBODIMENTS

Embodiments of the invention are now discussed with reference to the accompanying drawings. The terminology used in the description presented herein is not intended to be interpreted in any limited or restrictive manner, simply because it is being utilized in conjunction with a detailed description of certain embodiments of the invention.

In some implements, vehicles include heaters incorporated with interior materials for providing comfort of passengers. When heaters are combined with the interior materials of vehicles to perform heating as effectively as possible using secured electrical energy so that passengers can more quickly and uniformly feel warm.

However, a method of directly embedding heating lines in an interior material is used for panel type heaters in some implements, a burn and damage to the interior material may occur when the heating line is excessively hot. Additionally, it is required to separately install sensors that sense whether there is contact of a body. On the contrary, when the heating lines are not sufficiently hot, heat conduction becomes very slow. Accordingly, there is a need for a new type of heater that very quickly conducts heat and has no danger of causing a burn when a body comes in contact with it.

Figure 3:
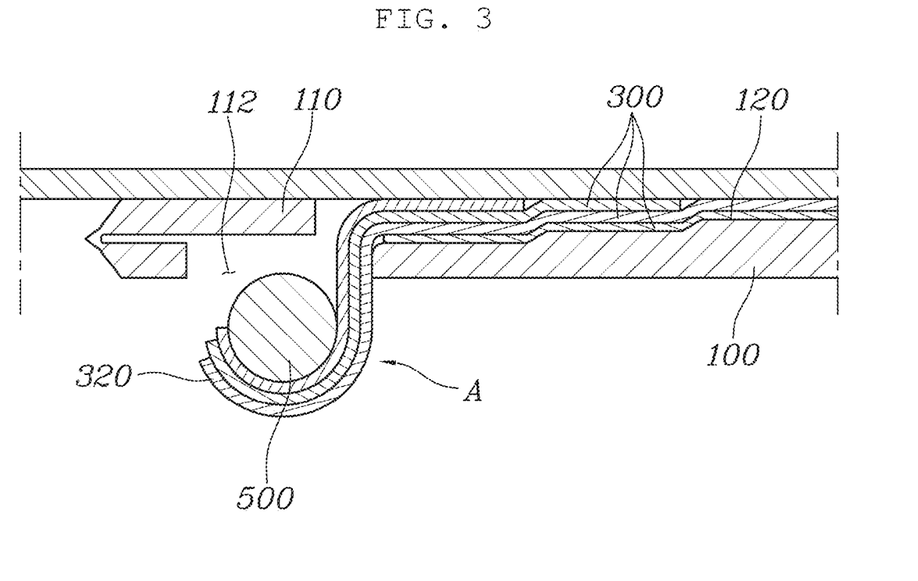
Figure 4:
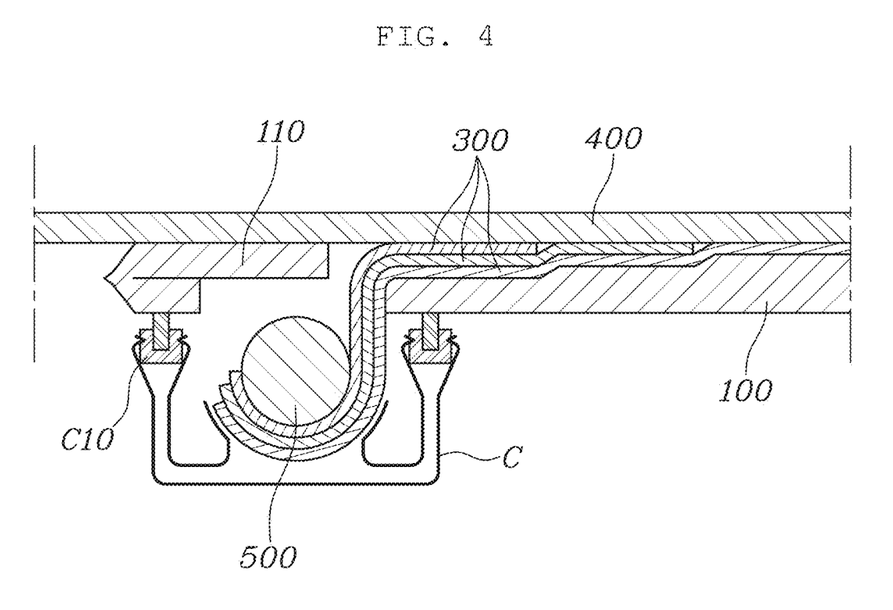
Figure 5:
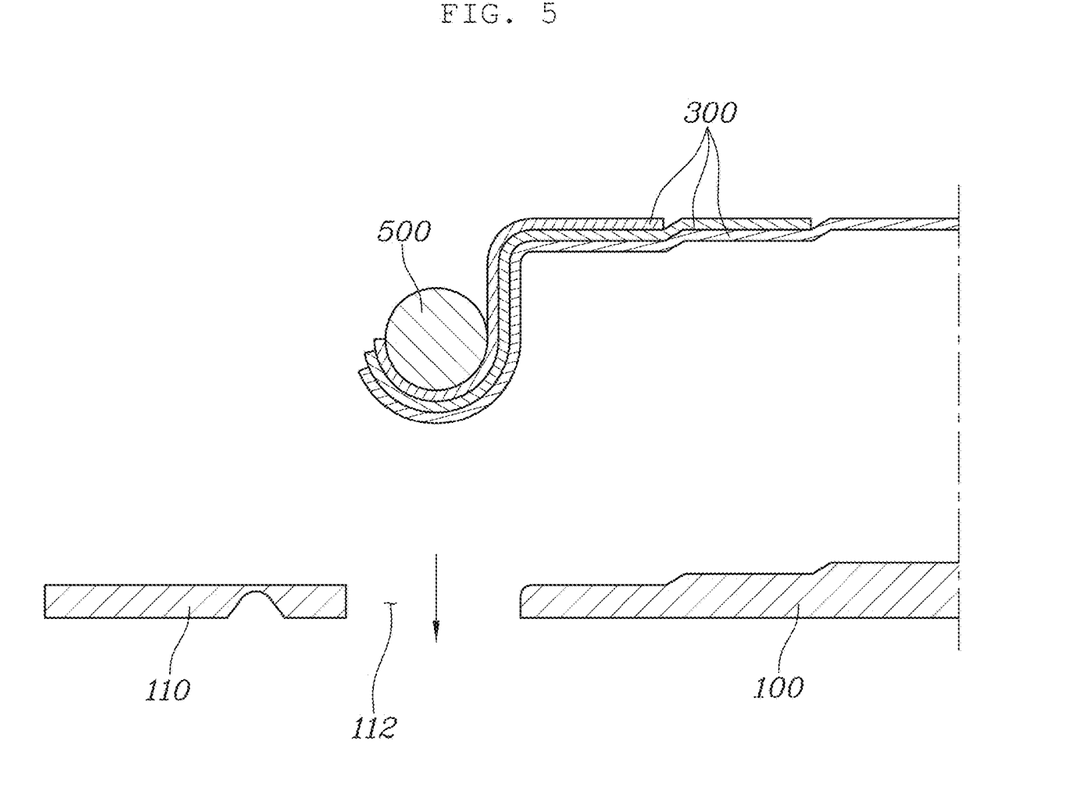
FIGS. 5 and 6 are views showing the sequence of assembly of a heater assembly according to an embodiment of the present disclosure.
Figure 6:
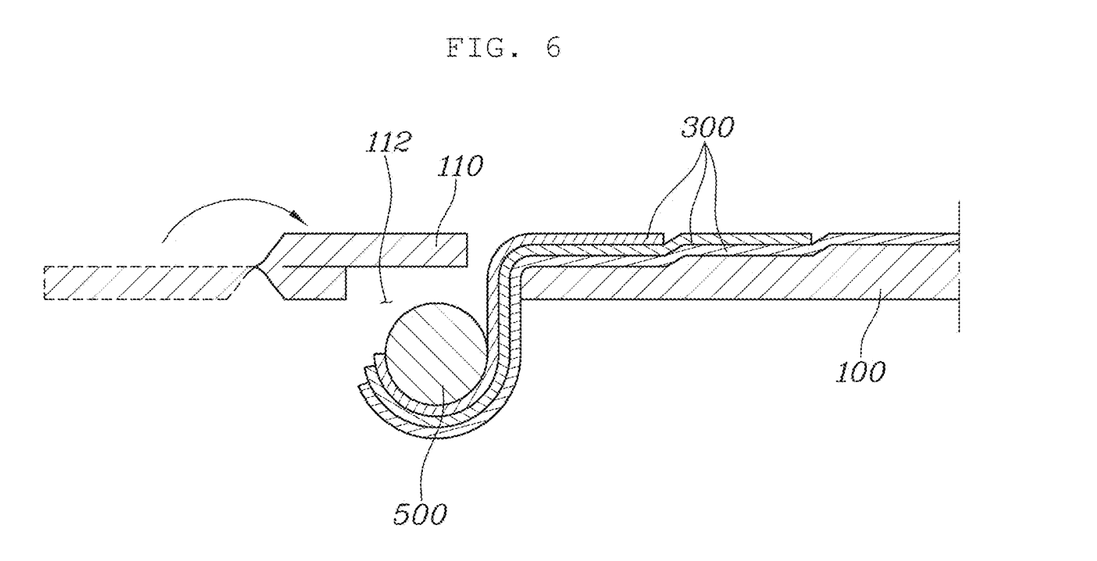

FIGS. 1 to 4 are views showing various embodiments of a heater assembly according to the present disclosure and FIGS. 5 and 6 are views showing the sequence of assembly of a heater assembly according to an embodiment of the present disclosure.

A heater assembly according to the present disclosure includes: a base panel 100; a heating member or heater 500 disposed behind the base panel 100 opposite a heating target space; a thermal conductive film 300 having a film shape, attached to the outer surface facing the heating target space of the base panel 100, and transmitting heat of the heating member 500 to the outer surface of the base panel 100 by having an end portion extending behind the base panel 100 and coupled to the heating member 500; and a shield layer 400 preventing the thermal conductive film 300 from being directly exposed to the heating target space by being attached to the outer surface facing the heating target space of the thermal conductive film 300.

In the heater assembly of the present disclosure, the heating member 500 is accommodated behind an interior material, so there is no danger of the heater 500 coming in contact with a body without being in direct contact with a panel. Accordingly, it is possible to prevent a burn on a body and thermal deformation of the interior material. Further, since a film that very quickly conducts heat is applied to the interior material panel, heat can be quickly transmitted and passengers can be warmed quickly feel. Further, the thermal conductive film very quickly conducts heat in the horizontal direction, but hardly conducts heat in the vertical direction, so there is no danger of causing a burn even if a body comes in contact with the thermal conductive film. This can be an advantage that there is no need for separate sensors.

In detail, the base panel of the present disclosure may be an interior material of a vehicle. Further, the base panel may be applied not only to an interior material, but also to most parts that require heating in a vehicle such as a high-voltage battery case. In some implementations, the base panel may be an interior panel in a vehicle and the heating target space may be the interior of a vehicle.

The heating member 500 is disposed behind the base panel 100 opposite the heating target space, thereby preventing thermal deformation of the interior material and preventing a danger of causing a burn on a body.

In embodiments, the thermal conductive film 300 has a film shape and is attached to the outer surface facing the heating target space of the base panel 100. An end portion of the thermal conductive film 300 extends behind the base panel and is coupled to the heating member, thereby transmitting the heat of the heating member 500 to the outer surface of the base panel 100. The thermal conductive film 300 is of a film type and is flexible, so it can be applied to various shapes of base panels. Further, the thermal conductive film 300 is not a direct heating member unlike a plane-shaped carbon member and an electrical resistance heating line and has a very low heat capacity, so it is quickly cooled when contact occurs.

Therefore, basically, there is no danger of causing a burn. This is because the thermal conductive film 300 does not generate heat and only quickly spreads heat of the heating member to the surface of the interior material.

The thermal conductive film 300 has come to be generally used, a representative field of use thereof being the discharge of heat from smartphones. In detail, the thermal conductive film by 'GUARDNEC Co., Ltd' located in Korea can be an example thereof. The thermal conductive film, which is a graphite film, is a type with a protective layer coated on a graphite layer. This product has excellent plane-directional heat dissipation performance and is manufactured in a thin film type, so it is suitable for downsizing and weight reduction. Further, the total thickness is a micrometer unit and the thermal conductivity is 1500 W/mK, which is very excellent.

After the thermal conductive film 300 is attached to the base panel 100, the shield layer is attached to the outer surface facing the heating target space of the thermal conductive film 300 to prevent the thermal conductive film 300 from being directly exposed to the heating target space, thereby protecting a body and prevent damage to the thermal conductive film. The shield layer may be configured to cover the outer surface of the thermal conductive film 300 using PU etc.

In detail, the heating member 500 may be an electrical resistance heating member or a sheath heater, but any heating members do not matter as long as they can generate heat using electrical energy. The heating member 500 is disposed at a predetermined distance behind the base panel 100, so it can be prevented from coming in direct contact with the base panel 100 and from being exposed to the heating target space. Accordingly, it is possible to prevent thermal deformation of the base panel 100 and prevent a safety accident.

An end portion 320 of the thermal conductive film 300 is wound around the surface of the heating member 500, so the heat of the heating member 500 can be transmitted from the end portion 320 to the other end portion of the thermal conductive film. The thermal conductive film 300, which transmits heat using a heat conduction phenomenon, has a characteristic in that it transmits the heat of the heating member 500 from the end portion 320 to the other end portion when the end portion 320 is coupled to the heating member 500. Accordingly, the heating member 500 is spaced at the rear space not to be exposed and heat is transmitted to the outer side of the interior material through the thermal conductive film 300.

Figure 1:
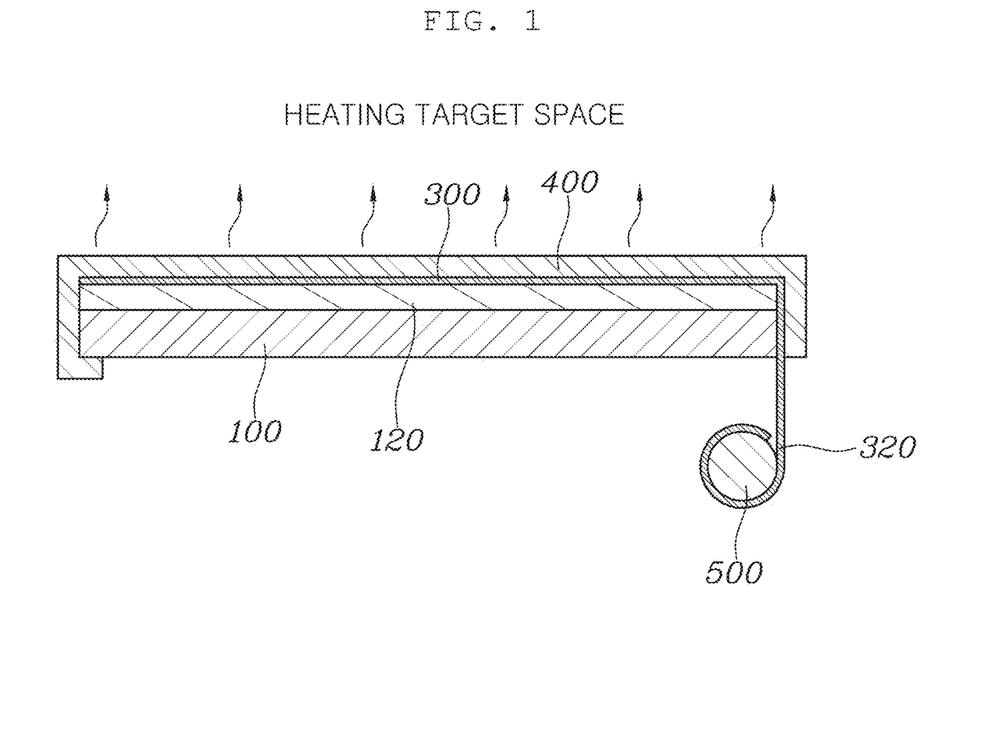
FIGS. 1 to 4 are views showing various embodiments of a heater assembly according to the present disclosure.

As shown in FIG. 1, the thermal conductive film 300 may be attached to the outer surface facing the heating target space of the base panel 100, and may be coupled to the heating member 500 by bending rearward around an end portion of the base panel 100 and then extending. In some implementations, since the thermal conductive film 300 bends at the end portion 320 behind the base panel 100 and accordingly the end portion 320 is coupled to the heating member 500, the heating member 500 is not exposed to the outside without being in direct contact with the base panel 100.

Figure 2:
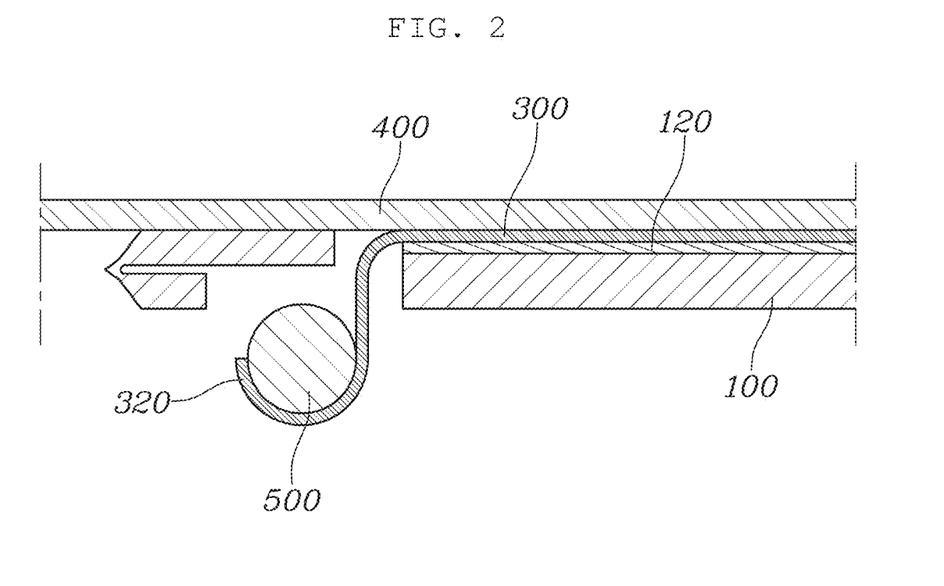

Further, as in FIGS. 2 to 4, a through-slit 112 may be formed in the base panel 100 and an end portion of the thermal conductive film 300 may be extended behind the base panel 100 through the through-slit 112 and then coupled to the heating member 500. In this case, the thermal conductive film 300 is allowed to bend rearward using the slit 112 of the base panel 100 such that the bending portion of the thermal conductive film 300 can be protected from external shock. Further, when the base panel is very wide and a local portion requires thermal conductivity, the slit 112 may be formed only at a portion such that application can be easy.

In embodiments, as in FIG. 3, a film assembly A may be formed by stacking a plurality of thermal conductive films 300 and may be attached to the outer surface of the base panel 100. Further, the thermal conductive films 300 of the film assembly A may be extended and attached to the base panel 100 with end portions 320 coupled together to the heating member 500, and the extension lengths may be different. According this configuration, the thermal conductive films 300 overlap each other at the portion close to the heating member 500, and the number of thermal conductive films 300 decreases moving away from the heating member 500, thereby preventing a phenomenon in which the temperature rapidly drops moving away from the heating member. Further, the temperature more gently drops toward the end, so the temperature can be uniformly distributed throughout the entire area of the interior material.

In embodiments, as in FIG. 4, a clip C is disposed on the rear surface of the base panel 100 and the heating member 500 is fastened to the clip C in the state of being combined with the film assembly A, so the heating member 500 can be disposed at a predetermined distance behind the base panel 100. Insulators C10 are disposed at the portions, which are in contact with the heating member 500 or the film assembly A, of the clip C, whereby thermal damage can be prevented.

In some implementations, it is possible to easily fix the heating member 500 by using the clip C, and even in this case, the insulators C10 are used to prevent heat transfer to the base panel 100 through the clip C. Accordingly, it is possible to stably space and mount the heating member 500 and increase the durability of the product by using the clip C and the insulators C10.

Further, as in FIGS. 5 to 6, a through-slit 112 is formed in an end portion of the base panel 100, end portions of the thermal conductive films 300 are extended behind the base panel 100 through the through-slit 112 and then coupled to the heating member 500, and an end portion 110 of the base panel 100 is folded over the base panel 100, thereby being able to block the through-slit 112 and fix the thermal conductive films 300 to the base panel 100.

In some instances, as in FIG. 5, by inserting the thermal conductive films 300 and the heating member 500 in the slit 112, the heating member can be inserted rearward even after an interior material is installed in a vehicle. Further, the end portion 110 of the base panel 100 is folded over the base panel 100, as in FIG. 6, in preparation for exposure of the components inside the base panel 100 due to the excessive size of the slit 112, whereby the slit 112 is blocked and the thermal conductive films 300 are fixed to the base panel 100. Accordingly, it is possible to more conveniently couple the heater assembly of the present disclosure to a vehicle and to fix the thermal conductive films. Further, exposure to the outside of the thermal conductive films 300 and the heating member 500 is prevented, thereby improving the durability of the product and securing the safety of a user.

In embodiments, an insulating layer 120 is disposed between the base panel 100 and the thermal conductive film 300, thereby being able to prevent thermal damage to the base panel. Further, since the thermal conductive film 300 has the characteristic in that it very quickly conducts heat in the horizontal direction but very slowly conducts heat in the vertical direction in the present disclosure, even if a user touches the thermal conductive film 300 with the hand, there is no danger of causing a burn due to low thermal conduction to the hand. Further, the thermal conductive film 300 is a thin film and has very small heat capacity, so even if a user touches the thermal conductive film 300, the thermal conductive film 300 is easily cooled. Accordingly, there is an advantage in that the heater assembly is very excellent in conducting and radiating heat and is safe.

According to the present disclosure, the heater assembly is used for the interior materials, etc. of a vehicle, is formed to have a small thickness, has no danger of causing a burn, and very quickly conducts heat.

Although the present disclosure was provided above in relation to embodiments shown in the drawings, it is apparent to those skilled in the art that the present disclosure may be changed and modified in various ways without departing from the scope of the present disclosure, which is described in the following claims.

What is claimed is:

1. A heater assembly comprising:
   a base panel;
   a heating member disposed behind the base panel opposite a heating target space and configured to generate heat;
   a shield layer disposed over a surface of the base panel facing the heating target space;
   a thermal conductive film comprising a proximal portion interposed between the shield layer and the base panel and a distal portion extending from the proximal portion attached to the heating member, the thermal conductive film being configured to transmit heat generated by the heating member from the distal portion to the proximal portion; and
   the shield layer configured to cover the proximal portion to inhibit the thermal conductive film from being directly exposed to the heating target space.

2. The heater assembly of claim 1, wherein the heating member is disposed at a predetermined distance behind the base panel, whereby the heating member is not in direct contact with the base panel and is not exposed to the heating target space.

3. The heater assembly of claim 1, wherein the distal portion of the thermal conductive film is wound around a surface of the heating member, whereby the heat of the heating member is transmitted from the distal portion to the proximal portion of the thermal conductive film.

4. The heater assembly of claim 1, wherein the proximal portion of the thermal conductive film is attached to the surface of the base panel, and is coupled to the heating member by bending rearward around an end portion of the base panel and then extending toward the heating member.

5. The heater assembly of claim 1, wherein a through-slit is formed in the base panel and the distal portion of the thermal conductive film is extended behind the base panel through the through-slit and then coupled to the heating member.

6. The heater assembly of claim 1, wherein the thermal conductive film comprises a plurality of thermal conductive layers, wherein one of the layers has a different length from another layer.

7. The heater assembly of claim 1, further comprising a clip disposed on a rear surface of the base panel and the heating member is fastened to the clip in a state of being combined with the film assembly, so the heating member is disposed at a predetermined distance behind the base panel.

8. The heater assembly of claim 1, wherein insulators are disposed at portions, which are in contact with the heating member or the film assembly, of the clip, so thermal damage is prevented.

9. The heater assembly of claim 1, wherein a through-slit is formed in an end portion of the base panel, an end portion of the thermal conductive film is extended behind the base panel through the through-slit and then coupled to the heating member, and an end portion of the base panel is folded over the base panel, whereby the through-slit is blocked and the thermal conductive films are fixed to the base panel.

10. The heater assembly of claim 1, wherein an insulating layer is disposed between the base panel and the thermal conductive film, thereby preventing thermal damage to the base panel.

11. The heater assembly of claim 1, wherein the base panel is an interior panel in a vehicle and the heating target space is the interior of a vehicle.

* * * * *